US007249120B2

(12) United States Patent
Bruno et al.

(10) Patent No.: US 7,249,120 B2
(45) Date of Patent: *Jul. 24, 2007

(54) METHOD AND APPARATUS FOR SELECTING CANDIDATE STATISTICS TO ESTIMATE THE SELECTIVITY VALUE OF THE CONDITIONAL SELECTIVITY EXPRESSION IN OPTIMIZE QUERIES BASED ON A SET OF PREDICATES THAT EACH REFERENCE A SET OF RELATIONAL DATABASE TABLES

(75) Inventors: Nicolas Bruno, Redmond, WA (US); Surajit Chaudhuri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 425 days.

This patent is subject to a terminal disclaimer.

(21) Appl. No.: 10/608,083

(22) Filed: Jun. 27, 2003

(65) Prior Publication Data

US 2005/0004907 A1    Jan. 6, 2005

(51) Int. Cl.
*G06F 17/30* (2006.01)
*G06F 7/00* (2006.01)

(52) U.S. Cl. .................. 707/2; 707/3; 707/5
(58) Field of Classification Search ............... 707/1–7, 707/100–102, 104.1, 103 R, 103 Y
See application file for complete search history.

(56) References Cited

U.S. PATENT DOCUMENTS 4,769,772 A * 9/1988 Dwyer ..................... 707/2
5,724,570 A * 3/1998 Zeller et al. ............... 707/3
5,806,061 A * 9/1998 Chaudhuri et al. ........ 707/3
5,950,186 A * 9/1999 Chaudhuri et al. ........ 707/2
6,029,163 A * 2/2000 Ziauddin .................. 707/2
6,061,676 A * 5/2000 Srivastava et al. ........ 707/3
6,088,691 A * 7/2000 Bhargava et al. .......... 707/2
6,272,487 B1 * 8/2001 Beavin et al. ............. 707/2
6,311,181 B1 * 10/2001 Lee et al. .................. 707/5
6,363,371 B1 * 3/2002 Chaudhuri et al. ........ 707/2
6,438,741 B1 * 8/2002 Al-omari et al. .......... 707/2
6,477,534 B1 * 11/2002 Acharya et al. ........ 707/100

(Continued)

FOREIGN PATENT DOCUMENTS

CA    2416368    * 10/2003    ............... 17/30

(Continued)

OTHER PUBLICATIONS

Chiang Lee et al. "Optimizing Large join queries using a graph-based approach", IEEE transactions on knowledge and data engineering, vol. 13, No. 2,Mar./Apr. 2001, pp. 298-315.*

(Continued)

*Primary Examiner*—Srirama Channavajjala (57) ABSTRACT

By transforming a query into a product of conditional selectivity expressions, an existing set of statistics on query expressions can be used more effectively to estimate cardinality values. Conditional selectivity values are progressively separated according to rules of conditional probability to yield a set of non-separable decompositions that can be matched with the stored statistics on query expressions. The stored statistics are used to estimate the selectivity of the query and the estimated selectivity can be multiplied by the Cartesian product of referenced tables to yield a cardinality value.

53 Claims, 5 Drawing Sheets

U.S. PATENT DOCUMENTS

| | | | |
|---|---|---|---|
| 6,516,310 B2* | 2/2003 | Paulley | 707/2 |
| 6,529,901 B1* | 3/2003 | Chaudhuri et al. | 707/3 |
| 6,629,095 B1* | 9/2003 | Wagstaff et al. | 707/5 |
| 6,714,938 B1* | 3/2004 | Avadhanam et al. | 707/102 |
| 6,778,976 B2* | 8/2004 | Haas et al. | 707/2 |
| 6,915,290 B2* | 7/2005 | Bestgen et al. | 707/2 |
| 6,947,927 B2* | 9/2005 | Chaudhuri et al. | 707/3 |
| 6,961,721 B2* | 11/2005 | Chaudhuri et al. | 707/1 |
| 6,983,275 B2* | 1/2006 | Koo et al. | 707/5 |
| 7,010,516 B2* | 3/2006 | Leslie | 707/2 |
| 2003/0018615 A1* | 1/2003 | Chaudhuri et al. | 707/1 |
| 2003/0120682 A1* | 6/2003 | Bestgen et al. | 707/104.1 |
| 2003/0229635 A1* | 12/2003 | Chaudhuri et al. | 707/6 |
| 2004/0249810 A1* | 12/2004 | Das et al. | 707/5 |
| 2004/0260675 A1* | 12/2004 | Bruno et al. | 707/2 |
| 2005/0071331 A1* | 3/2005 | Gao et al. | 707/4 |
| 2006/0294065 A1* | 12/2006 | Dettinger et al. | 707/3 |

FOREIGN PATENT DOCUMENTS

| | | | | |
|---|---|---|---|---|
| EP | 0743607 | * | 11/1996 | 17/30 |
| EP | 1564620 | * | 8/2005 | |
| WO | WO 92/15066 | * | 9/1992 | 15/403 |
| WO | WO 98/26360 | * | 6/1998 | 17/30 |
| WO | WO 02//41185 | * | 5/2002 | 17/30 |
| WO | WO 02/089009 | * | 11/2002 | 17/30 |

OTHER PUBLICATIONS

Dongwon Lee et al. "Conjuctive point predicate-based semantic caching for web databases", UCLA-CS-TR-980030, last revised: Sep. 24, 1998, pp. 1-21.*

Oliver M Duschka et al. "Query planning in infomaster", Proceedings of the 1997 ACM symposium on applied computing, 1997, pp. 109-111.*

Chun-Nan Hsu et al. "Semantic query optimization for query plans of heterogeneous multidatabase systems", IEEE transactions on knowledge and data engineering, vol. 12, No. 6, Nov./Dec. 2000, pp. 959-978.*

Nicolas Bruno, "Automatic management of statistics on Query expressions in relational databases", Ph.D. Thesis Proposal, Dept of computer science, Columbia University, NY, Apr. 25, 200232 pages.*

Stratis D Viglas et al. "Rate-based query optimization for streaming information sources", ACM SIGMOD 2002.*

Vijayshankar Raman et al. "partial results for online query processing", ACM/SIGMOD,2002.*

Jenk Ernst Blok et al. "A selectivity model for fragmented relations: applied in information retrieval", IEEE transactions on knowledge and daa engineering, vol. 16,No. 5, 2004, pp. 635-639.*

Yun-Wu Huang et al. "optimizing path query performance: graph clustering strategies", Transportation research part C 8 (2000) pp. 381-408.*

Faruk Polat et al. "semantic information-based alternative plan generation for multiple query optimization", information sciences 137 (2001) pp. 103-133.*

N. Bruno and S. Chaudhuri. Exploiting Statistics on Query Expressions for Optimization. In *Proceedings of the 2002 ACM International Conference on Management of Data (SIGMOND'2)*, 2002.

N. Bruno and S. Chaudhuri. Efficient Creation of Statistics over Query Expressions. In *Proceedings of the 19th International Conference on Data Engineering*, 2003.

N. Bruno, S. Chaudhuri, and L. Gravano. STHoles: A Multidimensional Workload-Aware Histogram. In *Proceedings of the 2001 ACM International Conference on Management of Data (SIGMOND'01)*, 2001.

S. Chaudhurin et al. Optimizing Queries with Materialized Views. In *Proceedings of the 11th International Conference on Data Engineering*, 1995.

J. Goldstein and P.-A. Larson. Optimizing Queries Using Materialized Views: A Practical, Scalable Solution. In *Proceedings of the 2001 ACM International Conference on Management of Data (SIGMOND'01)*, 2001.

G. Graefe. The Cascades Framework for Query Optimization. *Data Engineering Bulletin*, 18(3), 1995.

G. Graefe and W. McKenna. The Volcano Optimizer Generator: Extensibility and Efficient Search. In *Proceedings of the 9th Int. Conference on Data Engineering*, 1993.

G. Graefe and W. McKenna. The Volcano Optimizer Generator: Extensibility and Efficient Search. In *Proceedings of the 9th Int. Conference on Data Engineering*, 1993.

L. M. Haas, J. C. Freytag, G. M. Lohman, and H. Pirahesh. Extensible Query Processing in Starburst. In *Proceedings of the 1989 ACM International Conference on Management Data (SIGMOND'89 )*, 1989.

M. Muralikrishna and D. J. DeWitt. Equi-Depth Histograms For Estimating Selectivity Factors For Multi-Dimensional Queries. In *Proceedings of the 1988 ACM International Conference on Management of Data (SIGMOND'88)*, 1988.

V. Poosala and Y. E. Ioannidis. Selectivity Estimation Without the Attribute Value Independence Assumption. In *Proceedings of the Twenty-third International Conference on Very Large Databases (VLDB'97)*, Aug. 1997.

V. Poosala, Y. E. Ioannidis, P. J. Hass, and E. J. Shekita. Improved Histograms for Selectivity Estimation of Range Predicates. In *Proceedings of the 1996 ACM International Conference on Management of Data (SIGMOND'96)*, 1996.

M. Stillger, G. M. Lohman V. Markl, and M. Kandil. LEO—DB2's Learning Optimizer. In *Proceedings of the 27th International Conference on Very Large Databases*, 2001.

* cited by examiner

METHOD AND APPARATUS FOR SELECTING CANDIDATE STATISTICS TO ESTIMATE THE SELECTIVITY VALUE OF THE CONDITIONAL SELECTIVITY EXPRESSION IN OPTIMIZE QUERIES BASED ON A SET OF PREDICATES THAT EACH REFERENCE A SET OF RELATIONAL DATABASE TABLES

TECHNICAL FIELD

The invention relates generally to the field of relational databases and specifically to the field of optimizing quenes on databases.

BACKGROUND OF THE INVENTION

Most query optimizers for relational database management systems (RDBMS) rely on a cost model to choose the best possible query execution plan for a given query. Thus, the quality of the query execution plan depends on the accuracy of cost estimates. Cost estimates, in turn, crucially depend on cardinality estimations of various sub-plans (intermediate results) generated during optimization. Traditionally, query optimizers use statistics built over base tables for cardinality estimates, and assume independence while propagating these base-table statistics through the query plans. However, it is widely recognized that such cardinality estimates can be off by orders of magnitude. Therefore, the traditional propagation of statistics can lead the query optimizer to choose significantly low-quality execution plans.

SUMMARY OF THE INVENTION

Using conditional selectivity as a framework for manipulating query plans to leverage statistical information on intermediate query results can result in more efficient query plans. A number of tuples returned by a database query having a set of predicates that each reference a set of database tables can be approximated. The query is decomposed to form a product of partial conditional selectivity expressions. The partial conditional selectivity expressions are then matched with stored statistics on query expressions to obtain estimated partial conditional selectivity values. The selectivity of the query is then estimated by combining the obtained partial conditional selectivity results. The resulting query selectivity estimate can be multiplied by a Cartesian product of the tables referenced in the query to arrive at a cardinality value.

The decomposition of the query can be performed recursively by repeatedly separating conditional selectivity expressions into atomic decompositions. During matching an error can be associated with a selectivity estimation that is generated using a given statistic and those statistics with the lowest error may be selected to generate the query selectivity estimation. The error may be based on the difference between a statistic that is generated by an intermediate query result and a statistic on the corresponding base table. Statistics on query expressions that correspond to a subset of the predicates represented in a given selectivity expression may be considered for estimating the selectivity of the given selectivity expression. In an optimizer environment, the decomposition may be guided by the sub-plans generated by the optimizer. A wider variety of queries can be decomposed by transforming disjunctive query predicates into conjunctive query predicates.

BRIEF DESCRIPTION OF THE DRAWINGS

The present invention is illustrated by way of example and not limitation in the figures of the accompanying drawings, in which.

DETAILED DESCRIPTION OF THE PREFERRED EMBODIMENT

Exemplary Operating Environment

Figure 1:
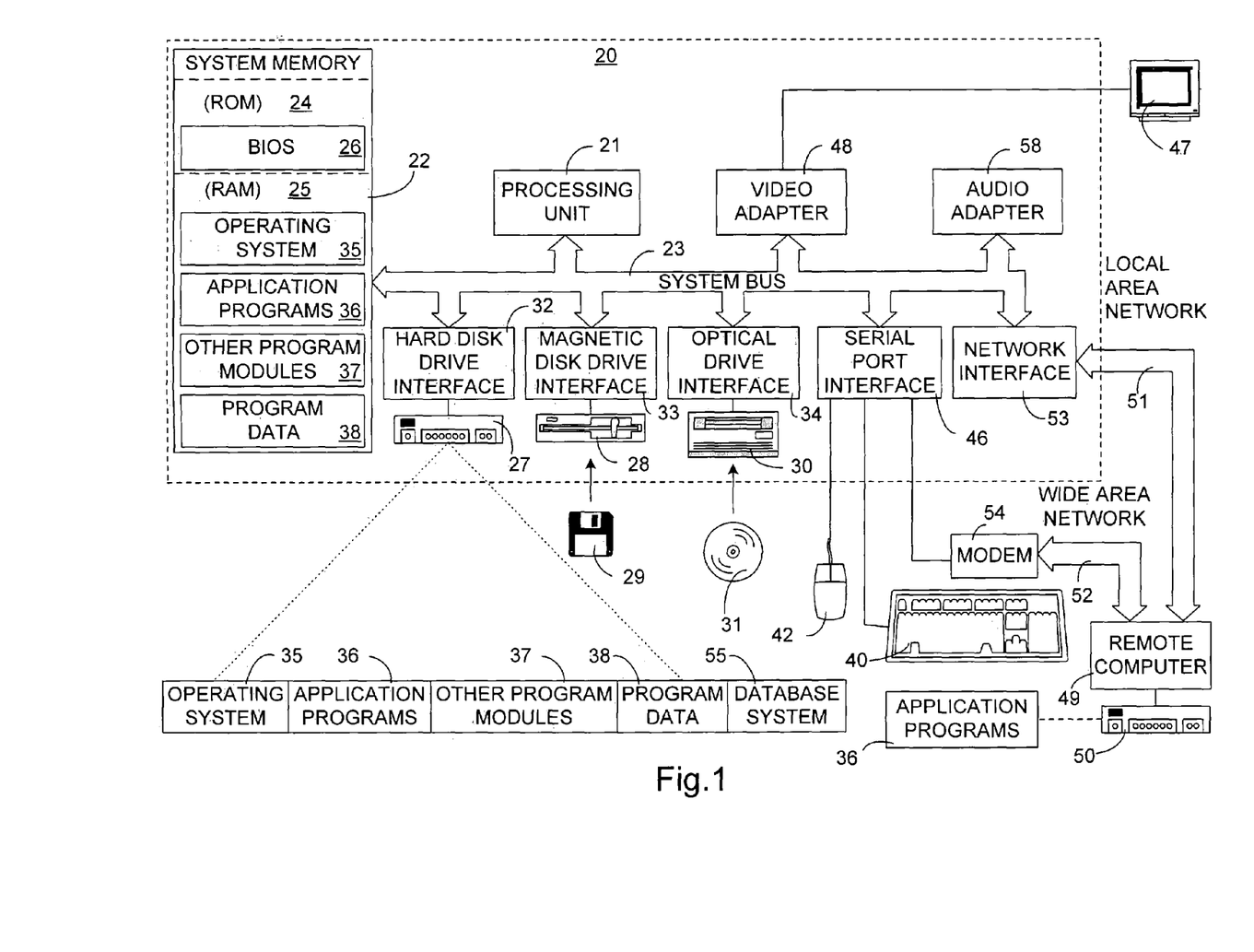
FIG. 1 illustrates an exemplary operating environment for a system for evaluating database queries using statistics maintained on intermediate query results.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 24 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disk drive 30 for reading from or writing to a removable optical disk 31 such as a CD ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk, magnetic disk 129, optical disk 31, ROM 24 or RAM 25, including an operating system 35, one or more application programs 36, other program modules 37, and program data 38. A database system 55 may also be stored on the hard disk, magnetic disk 29, optical disk 31, ROM 24 or RAM 25. A user may enter commands and information into personal computer 20 through input devices such as a keyboard 40 and pointing device 42. Other input devices may include a microphone, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include local area network (LAN) 51 and a wide area network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other means for establishing communication over wide area network 52, such as the Internet. Modem 54, which may be internal or external, is connected to system bus 23 via serial port interface 46. In a networked environment, program modules depicted relative to personal computer 20, or portions thereof, may be stored in remote memory storage device 50. It will be appreciated that the network connections shown are exemplary and other means of establishing a communications link between the computers may be used.

Cost Estimation Using Cardinality Estimates Based on Statistics on Intermediate Tables SITs are statistics built over the results of query expressions or intermediate tables, and their purpose is to eliminate error propagation through query plan operators. For the purposes of this description, a SIT is defined as follows: Let R be a table, A an attribute of R, and Q an SQL query that contains R.A in the SELECT clause. SIT(R.A|Q) is the statistic for attribute A on the result of the executing query expression Q. Q is called the generating query expression of SIT (R.A|Q). This definition can be extended for multi-attribute statistics. Furthermore, the definition can be used as the basis for extending the CREATE STATISTICS statement in SQL where instead of specifying the table name of the query, more general query expression such as a table valued expression can be used.

In U.S. patent application Ser. No. 10/191,822, which issued as U.S. Pat. No. 6,947,927 on Sep. 20, 2005, incorporated herein by reference in its entirety, the concept of SITs was introduced. A particular method of adapting a prior art query optimizer to access and utilize a preexisting set of SITs for cost estimation was described in detail in this application, which method is summarized here briefly as background information.

Figure 2:
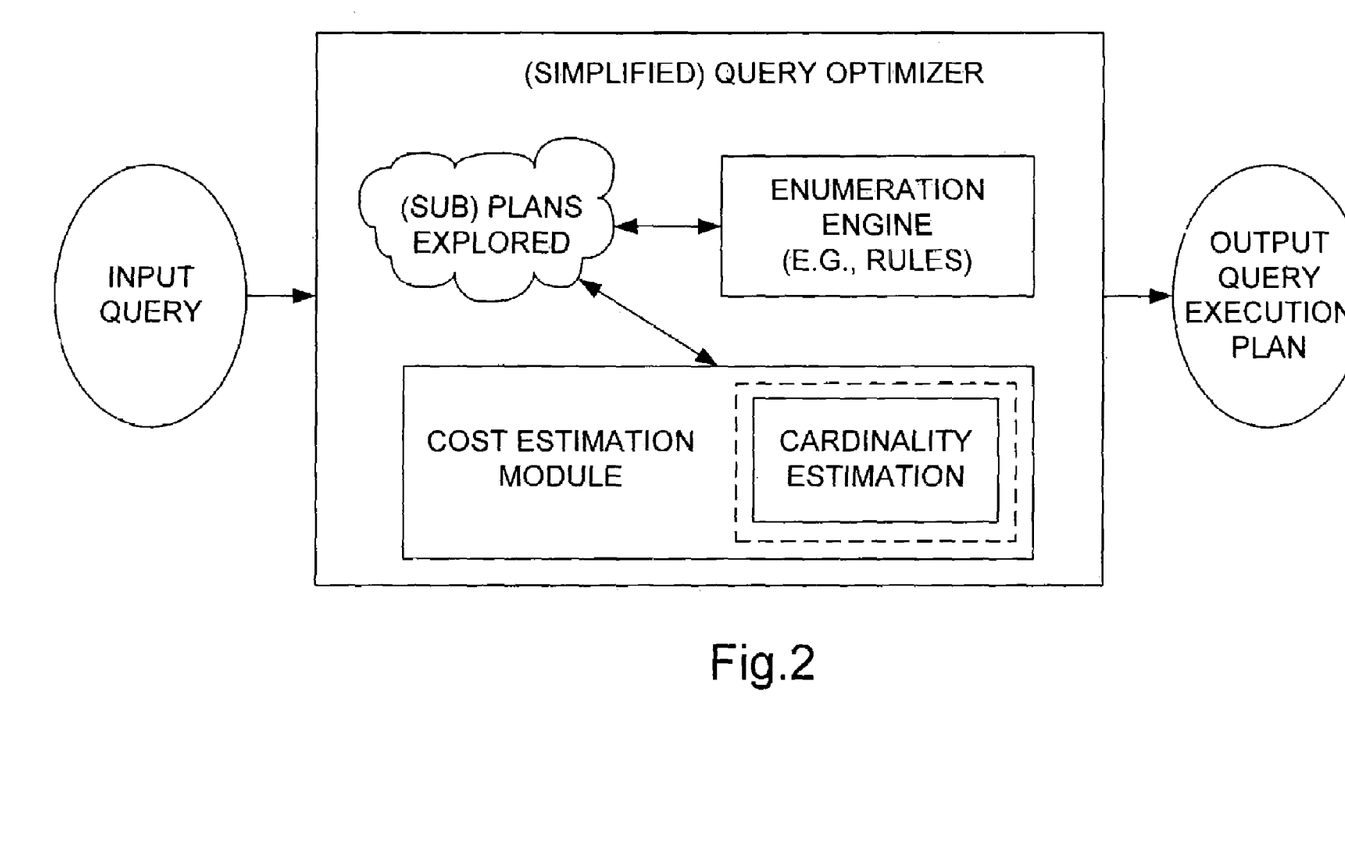
FIG. 2 is a block diagram of a prior art optimizer that can be used in conjunction with the present invention.

Referring to FIG. 2, the query optimizer examines an input query and generates a query execution plan that most efficiently returns the results sought by the query in terms of cost. The cost estimation module and its imbedded cardinality estimation module can be modified to utilize statistics on query expressions, or intermediate tables, to improve the accuracy of cardinality estimates.

In general, the use of SITs is enabled by implementing a wrapper (shown in phantom in FIG. 2) on top of the original cardinality estimation module of the RDBMS. During thee optimization of a single query, the wrapper will be called many times, once for each different query sub-plan enumerated by the optimizer. Each time the query optimizer invokes the modified cardinality estimation module with a query plan, this input plan is transformed by the wrapper into another one that exploits SITs. The cardinality estimation module uses the input plan to arrive at a potentially more accurate cardinality estimation that is returned to the query optimizer. The transformed query plan is thus a temporary structure used by the modified cardinality and is not used for query execution.

According to the embodiment described in application Ser. No. 10/191,822, is now U.S. Pat. No. 6,947,927 the transformed plan that is passed to the cardinality estimation module exploits applicable SITs to enable a potentially more accurate cardinality estimate. The original cardinality estimation module requires little or no modification to accept the transformed plan as input. The transformation of plans is performed efficiently, which is important because the transformation will be used for several sub-plans for a single query optimization.

In general, there will be no SIT that matches a given plan exactly. Instead, several SITs might be used for to some (perhaps overlapping) portions of the input plan The embodiment described in application Ser. No. 10/191,822 is now U.S. Pat. No. 6,947,927 integrates SITs with cardinality estimation routines by transforming the input plan into an equivalent one that exploits SITs as much as possible. The transformation step is based on a greedy procedure that selects which SITs to apply at each iteration, so that the number of independence assumptions during the estimation for the transformed query plan is minimized. Identifying whether or not a SIT is applicable to a given plan leverages materialized view matching techniques as can be seen in the following example.

Figure 3:
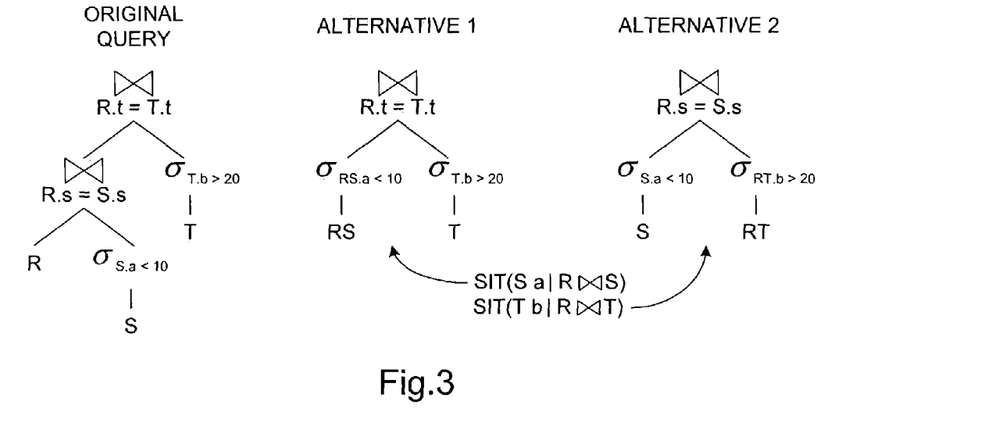
FIG. 3 is tree diagram for a query and two alternative execution sub-plans for a prior art optimizer.

In the query shown in FIG. 3(a) $R \triangleright \triangleleft S$ and $R \triangleright \triangleleft T$ are (skewed) foreign-key joins. Only a few tuples in S and T verify predicates $\sigma_{S.a<10}(S)$ and $\sigma_{T.b>20}(T)$ and most tuples in R join precisely with these tuples in S and T. In the absence of SITs, independence is assumed between all predicates and the selectivity of the original query is estimated as the product of individual join and filter selectivity values. This will produce a very small number, clearly a gross underestimate of the selectivity value. In the presence of the two SITs shown in FIG. 3, the two maximal equivalent rewritings shown in FIG. 3(b) and 3(c) are explored and one of them is selected as the transformed query plan. Each alternative exploits one available SIT and therefore takes into consideration correlations introduced by one of the skewed joins. Thus, the resulting estimations, although not perfect, have considerably better quality than when base-tables statistics are used.

Because the previous example employed view matching techniques as the main engine to guide transformations, no alternative was explored that exploited both SITs simultaneously. This is a fundamental constraint that results from relying exclusively on materialized view matching to enumerate alternatives. Therefore it is desirable to supplement the enumerated alternatives from materialized view matching with additional alternatives that leverage multiple SITs simultaneously. This is accomplished by using conditional selectivity as a formal framework to reason with selectivity values to identify and exploit SITs for cardinality estimation.

Conditional Selectivity

The concept of conditional selectivity allows expression of a given selectivity value in many different but equivalent ways. This description will focus on conjunctive Select Project Join queries, but the methods herein can be extended to handle more general queries.

An arbitrary SPJ query is represented in a canonical form by first forming the Cartesian product of the tables referenced in the query, then applying all predicates (including joins) to the Cartesian product, and projecting out the desired attributes. Thus, an SPJ query is represented as:

$$q = \pi_{a_1, \ldots, a_{na}}(\sigma_{p1 \wedge \ldots \wedge p_{np}}(R_1 \times \ldots \times R_n))$$

where $a_i$ are attributes of $R_1 \times \ldots \times R_n$, and $p_i$ are predicates over $R_1 \times \ldots \times R_n$ (e.g. $R_1.a \leq 25$, or $R_1.x = R_2.y$).

Each set of predicates $\{p_i\}$ that is applied to $R_1 \times \ldots \times R_n$ results in the subset of tuples that simultaneously verify all $p_i$. Using bag semantics, projections do not change the size of the output, and therefore projections are omitted from consideration when estimating carnalities. To estimate the size of the output, or its cardinality, the fraction of tuples in $R_1 \times \ldots \times R_n$ that simultaneously verify all predicates $p_i$ (i.e. the selectivity of all $p_i$) is approximated, and then this fraction is multiplied by $|R_1 \times \ldots \times R_n|$, which can be obtained by simple lookups over the system catalogs. The use of selectivities to obtain carnalities results in simpler derivations. The classical definition of selectivity is extended as follows:

Let $\mathcal{R} = \{R_1, \ldots, R_n\}$ be a set of tables, and $P = \{p_1, \ldots, p_j\}$, $Q = \{q_1, \ldots, p_k\}$ be sets of predicates over $R^x = R_1 \times \ldots \times R_n$. The selectivity of p with respect to $\sigma_{q1 \wedge \ldots \wedge q_k}(R^x)$, denoted $Sel_R(P|Q)$, is defined as the fraction of tuples in $\sigma_{q1 \wedge \ldots \wedge q_k}(R^x)$ that simultaneously verify all predicates in P. Therefore, $$Sel_R(P|Q) = \frac{|\sigma_{pl \wedge \ldots \wedge pj}(\sigma_{ql \wedge \ldots \wedge qk}(R_1 \times \ldots \times R_n))|}{|\sigma_{ql \wedge \ldots \wedge qk}(R_1 \times \ldots \times R_n)|}$$

If $Q = \emptyset$, this reduces to $Sel_\mathcal{R}(P)$, which agrees with the traditional definition of selectivity.

In this description, tables(P) denotes the set of tables referenced by a set of predicates P, and attr(P) denotes the set of attributes mentioned in P. To simplify the notation, "P,Q" denotes "$P \cup Q$" and "p,Q" denotes "$\{p\} \cup Q$", where p is a predicate and P and Q are sets of predicates. For example, given the following query:

SELECT*FROM R,S,T

WHERE R.x=S.y AND S.a<10 and T.b>5 the selectivity of q, $Sel_{\{R,S,T\}}$(R.x=S.y,S.a<10,T.b>5) is the fraction of tuples in RST that verify all predicates. Additionally, tables(R.x=S.y,S.a<10)={R,S}, and attr(R.x=S.y, S.a<10)={R.x,S.y,S.a}.

In general the task is to estimate $Sel_\mathcal{R}(p1, \ldots, p_k)$ for a given query $\sigma_{p1 \wedge \ldots \wedge pk}(R^x)$. Two properties, atomic decomposition and separable decomposition, are verified by conditional selectivity values and allow a given selectivity to be expressed in many equivalent ways. Proofs of the properties are omitted.

Atomic decomposition is, based on the notion of conditional probability and unfolds a selectivity value as the product of two related selectivity values:

$$Sel_\mathcal{R}(P,Q) = Sel_\mathcal{R}(P|Q) Sel_\mathcal{R}(Q)$$

The property of atomic decomposition holds for arbitrary sets of predicates and tables, without relying on any assumption, such as independence. By repeatedly applying atomic decompositions over an initial selectivity value S, a very large number of alternative rewritings for S can be obtained, which are called decompositions. The number of different decompositions of $Sel_\mathcal{R}(p1, \ldots, p_n)$, denoted by T(n), is bounded as follows: $0.5(n+1)! \leq T(n) \leq 1.5^n n!$ for $n \geq 1$.

In the presence of exact selectivity information, each possible decomposition of $Sel_\mathcal{R}(P)$ results in the same selectivity value (since each decomposition is obtained through a series of equalities). In reality, exact information may not be available. Instead, a set of SITs is maintained and used to approximate selectivity values. In such cases, depending on the available SITs, some decompositions might be more accurate than others. To determine which decompositions are more accurate, a measure of how accurately S can be approximated using the current set of available SITs is assigned to each decomposition S of $Sel_\mathcal{R}(P)$. Then approximating $Sel_\mathcal{R}(P)$ can be treated as an optimization problem in which the "most accurate" decomposition of $Sel_\mathcal{R}(P)$ for the given set of available SITs is sought.

A naïve approach to this problem would explore exhaustively all possible decompositions of $Sel_\mathcal{R}(P)$, estimate the accuracy of each decomposition and return the most accurate one. To improve on this approach, the notion of separability is used. Separability is a syntactic property of conditional selectivity values that can substantially reduce the space of decompositions without missing any useful one. It is said that $Sel_\mathcal{R}(P)$ is separable (with Q possibly empty) if non-empty sets $X_1$ and $X_2$ can be found such that $P \cup Q = X_1 \cup X_2$ and tables$(X_1) \cap$ tables$(X_2) = \emptyset$. In that case, $X_1$ and $X_2$ are said to separate $Sel_\mathcal{R}(P)$. For example, given $P = \{T.b=5, S.a<10\}$, $Q = \{R.x=S.y\}$, and $S = Sel_{\{R,S,T\}}(P|Q)$, $X_{1=\{T.b=5\}}$ and $X_2=\{R.x=S.y, S.a<10\}$ separate S. This is because tables$(X_1)=\{T\}$ and tables $(X_2)=\{R,S\}$. If S.y=T.z were added to Q, the resulting selectivity expression is no longer separable.

Intuitively, $Sel_\mathcal{R}(P|Q)$ is separable if $\sigma_{P\cdot Q}(R^x)$ combines some tables by using Cartesian products. It is, important to note, however, that even if the original query does not use any Cartesian product, after applying atomic decompositions some of its factors cane become separable. The property of separable decomposition, which is applicable where the independence assumption is guaranteed to hold, follows:

Given that $\{P_1,P_2\}$ and $\{Q_1,Q_2\}$ are partitions of P and Q, respectively, and $X_1=P_1\cup Q_1$ and $X_2=P_2\cup Q_2$; and $R_1$=tables $(X_1)$ and $R_2$=tables$(X_2)$. $Sel_\mathcal{R}(P|Q)$ can be separated into $Sel_\mathcal{R}(P_1|Q_1)\cdot Sel_\mathcal{R}(P_2|Q_2)$. For example, $\{T.b=5\}$ and $\{R.x=S.y, S.a<10\}$ can be separated into $S=Sel_{\{R,S,T\}}(T.b=5, S.a<10|R.x=S.y)$ which yields $S=Sel_{\{R,S\}}((R.x=S.y, S.a<10)\cdot Sel_{\{T\}}(T.b=5)$.

Using the separable decomposition property, it can be assumed that if $\mathcal{H}$ is a statistic that approximates $Sel_\mathcal{R}(P|Q)$ and $Sel_\mathcal{R}(P|Q)$ is separable as $Sel_{\mathcal{R}1}(P_{1|Q1})\cdot Sel_{\mathcal{R}2}(P_{2|Q2})$ then there are two statistics $\mathcal{H}_1$ and $\mathcal{H}_2$ that approximate $Sel_{\mathcal{R}1}(P_1|Q_1)$ and $Sel_{\mathcal{R}2}(P_2|Q_2)$ such that: 1) $\mathcal{H}_1$ and $\mathcal{H}_2$ combined require at most as much space as $\mathcal{H}$ does, and 2) the approximation using $\mathcal{H}_1$ and $\mathcal{H}_2$ is as accurate as that of $\mathcal{H}$. For example, $Sel_{\{R,S\}}(R.a<10, S.b>20)$, is separable as $Sel_{\{R\}}(R.a<10)\cdot Sel_{\{S\}}(S.a>20)$. In this situation, using two uni-dimensional histograms H(R.a) and H(S.b) to estimate each factor and then multiplying the resulting selectivity values assuming independence (which is correct in this case) will be at least as accurate as using directly a two dimensional histogram H(R.a,S.b) built on R×S. In fact, the independence assumption holds in this case, so the joint distribution over $\{R.a,S.b\}$ can be estimated correctly from uni-dimensional distributions over R.a and S.b. For that reason, statistics that directly approximate separable factors of decompositions do not need to be maintained since such statistics can be replaced by more accurate and space-efficient ones. Therefore, all decompositions $S=S_1\cdot\ldots\cdot S_n$ for which some $S_i$ is separable can be discarded without missing the most accurate decompositions.

The separable decomposition property and the above assumption can substantially reduce the search space, since consideration of large subsets of decompositions can be avoided. However, in many cases the search space is still very large. To make the optimization problem manageable, some restrictions can, be imposed on the way the accuracy of decomposition is measured. A dynamic-programming algorithm can then return the most accurate decomposition for a given selectivity value, provided that the function that measures the accuracy of the decompositions is both monotonic and algebraic.

The error of a decomposition, which measures the accuracy of the available set of statistics approximating the decomposition, must verify two properties, monotonicity and algebraic aggregation. Given $S=Sel_\mathcal{R}(p_1, \ldots, p_n)$ is a selectivity value and $S= S_1\cdot\ldots\cdot S_k$ is a non-separable decomposition of $S$ such that $S_i=Sel_\mathcal{R}(P_i|Q_i)$. If statistic $\mathcal{H}_i$ is used to approximate $S_i$, the error$(\mathcal{H}_i,S_i)$ is the level of accuracy of $\mathcal{H}_i$ approximating $S_i$. The value error$(\mathcal{H}_i,S_i)$ is a positive real number, where smaller values represent better accuracy. The estimated overall error for $S=S_1\ldots S_k$ is given by an aggregate function $E(e_1, \ldots, e_n)$, where $e_i$=error $(\mathcal{H}_i,S_i)$.

E is monotonic if every time that $e_i\leq e'_i$ for all i, $E(e_1, \ldots, e_n)\leq E(e'_1, \ldots, e'_n)$. Monotonicity is a reasonable property for aggregate functions representing overall accuracy: if each individual error $e'_i$ is at least as high as error $e_i$, then the overall $E(e'_1, \ldots, e'_n)$ would be expected to be at lest as high as $E(e_1, \ldots, e_n)$.

F is distributive if there is a function G such that $F(x_1, \ldots, x_n)=G(F(x_1, \ldots, x_n), F(x_{i+1}, \ldots, x_n))$. Two examples of distributive aggregates are max (with G=max) and count (with G=sum). In general, E is algebraic if there are distributive functions $F_1, \ldots, F_m$ and a function H such that $E(x_1, \ldots, x_n)=H(F_1(x_1, \ldots, x_n), \ldots, F_m(x_1\ldots, x_n))$. For example avg is algebraic with $F_1$=sum, $F_2$=count, and H(x,y)=x|y. For simplicity, for an algebraic E, $E_{merge}$ $(E(x_1, \ldots, x_i), \ldots, (E(x_{i+1}, \ldots, x_n))$ is defined as $E(x_1, \ldots, x_n)$. Therefore, $avg_{merge}(avg(1,2), avg(3,4))$=avg (1,2,3,4).

Monotonicity imposes the principle of optimality for error values, and allows a dynamic programming strategy to find the optimal decomposition of $Sel_\mathcal{R}(P)$. The principle of optimality states that the components of a globally optimal solution are themselves optimal. Therefore the most accurate decomposition of $Sel_\mathcal{R}(P)$ can be found by trying all atomic decompositions $Sel_\mathcal{R}(P|Q)=Sel_\mathcal{R}(P'|Q)\cdot Sel_\mathcal{R}(Q)$, recursively obtaining the optimal decomposition of $Sel_\mathcal{R}(Q)$, and combining the partial results. In turn, the key property of an algebraic aggregate E is that a small fixed-size vector can summarize sub-aggregations and therefore the amount of information needed to carry over between recursive calls to calculate error values can be bounded.

Building on the decomposition and error principles discussed above, FIG. 4 illustrates a recursive algorithm "get-Selectivity" designated generally as 400 for obtaining an accurate approximation of a selectivity value. In general, getSelectivity separates a selectivity value into simpler factors and then recursively calls itself to obtain partial selectivity values that are then combined to obtain the requested selectivity value. The algorithm relies on the error function being monotonic and algebraic, and avoids considering decompositions with separable factors. The pruning technique uses the fact that there is always a unique decomposition of $Sel_\mathcal{R}(P)$ into non-separable factors of the form $Sel_{\mathcal{R}i}(P_i)$. In other words, given a desired $Sel_\mathcal{R}(P)$, and repeatedly applying the separable decomposition property until no single resulting factor is separable, the same non-separable decomposition of $Sel_\mathcal{R}(P)$ will result.

Figure 4:
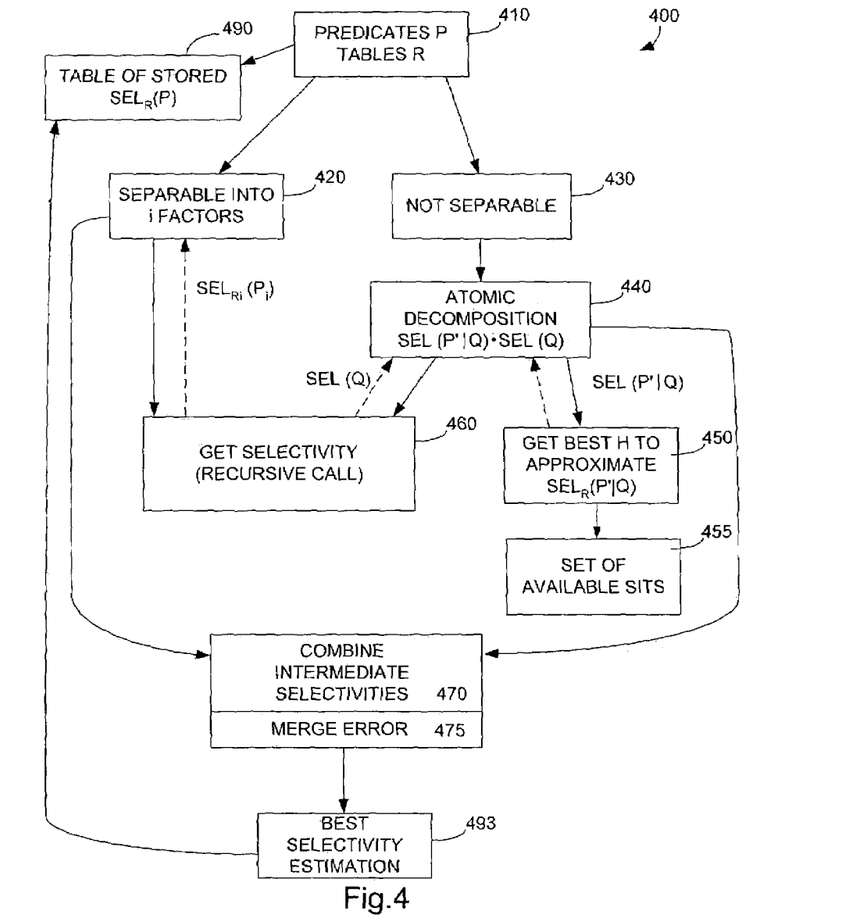
FIG. 4 is a block diagram for a method for evaluating database queries using statistics maintained on intermediate query results according to an embodiment of the present invention.

In step 410, the algorithm considers an input predicate P over a set of tables R. The algorithm first checks to see if $Sel_\mathcal{R}(P)$ has already been stored in a memoization table indicated as 490. If the value is stored, the algorithm returns that value and the process ends. If the value has not yet been stored, the algorithm determines if the input selectivity value predicate $Sel_\mathcal{R}(P)$ is separable and if so separates $Sel_\mathcal{R}(P)$ into i factors (step 420). For each factor, getSelectivity is recursively called (Step 460) and the optimal decomposition is obtained for each factor. Then, partial results and errors are combined in steps 470 and 475 and returned. Otherwise, $Sel_\mathcal{R}(P)$ is not separable and it is passed to steps 430 and 440 where all atomic decompositions $Sel_\mathcal{R}(P'|Q)\cdot Sel_\mathcal{R}(Q)$ are tried. For each alternative decomposition, $Sel_\mathcal{R}(Q)$ is recursively passed to getSelectivity (Step 460). Additionally, in step 450 $Sel_\mathcal{R}(P'|Q)$ is approximated using the best available SITs among the set of available statistics 455. If no single statistic is available in step 450 the error$_{P|Q}$ is set to ∞ and another atomic decomposition of the factor is considered. After all atomic decompositions are explored in steps 440 and 450 the most accurate estimation for $Sel_\mathcal{R}(P)$ (493) and its associated error is calculated in steps 470 and 475 and returned (and stored in the table 490). As a byproduct of getSelectivity, the most accurate selectivity estimation for every sub-query $\sigma_{p'}(\mathcal{R}^\mathcal{X})$ with $P' \subseteq P$ is obtained. It can be shown that getSelectivity(R,P) returns the most accurate approximation of $Sel_\mathcal{R}(P)$ for a given definition of error among all non-separable decompositions. A pseudo code implementation of getSelectivity follows:

```
getSelectivity (R:tables, P:predicates over R^x)
Returns (Sel_R(P), error_P) such that error_P is best among all
non-separable decompositions
01  if (Sel_R(P)) was already calculated)
02      (Sel_R(P)), error_P) = memoization_table_lookup(P)
03  else if Sel_R(P) is separable
04      get the standard decomposition of Sel_R(P):
              Sel_R(P)= Sel_R1(P_1)·....·Sel_Rn(P_n)
05      (S_Pi, error_Pi) = getSelectivity(R_i,P_i) (for each i=1..n)
06      S_P=S_p1...S_pn
07      error_P =E_merge(error_P1,...., error_Pn)
08  else // Sel_R(P) is non-separable
09      error_P = ∞; bestH = NULL
10      for each P' ⊆ P, Q = P − P'
              // check atomic decomposition Sel_R(P'|Q)) · Sel_R(Q))
11          (S_Q error_Q) = getSelectivity(R,Q)
12          (H, error_P'|Q) = best statistic (along with the estimated error)
              to approximate Sel_R(P'|Q))
13          if (E_merge(error_P'|Q, error_Q) ≤ error_P)
14              S_P = E_merge(error_P'|Q, error_Q)
15              bestH = H
16          S_P'|Q = estimation of Sel_R(P'|Q) using bestH
17          S_P = S_P'|Q·S_Q
18  memoization_table_insert(P, S_P, error_P)
19  return (S_P, error_P)
```

The worst-case complexity of getSelectivity is $\mathcal{O}(3^n)$, where n is the number of input predicates. In fact, the number of different invocations of getSelectivity is at most $2^n$, on for each subset of P. Due to memoization, only the first invocation to getSelectivity for each subset of P actually produces some work (the others are simple lookups). The running time of getSelectivity for k input predicates (not counting recursive calls) is $\mathcal{O}(k^2)$ for separable factors and $\mathcal{O}(2^k)$ for non-separable factors.

Therefore the complexity of getSelectivity is $$O\left(\sum_{k=1}^{n} \binom{n}{k} \cdot 2^k\right),$$

or $\mathcal{O}(3^n)$. In turn, the space complexity of getSelectivity is $\mathcal{O}(2^n)$ to store in the memoization table selectivity and error values for $Sel_\mathcal{R}(p)$ with $p \subseteq P$.

The worst-case complexity of getSelectivity, $\mathcal{O}(3^n)$, can be contrasted with the lower bound of possible decompositions of a predicate, $\mathcal{O}((n+1)!)$. Since $(n+1)!3^n$ is $\Omega(2^n)$, by using monotonic error functions the number of decompositions that are explored is decreased exponentially without missing the most accurate one. If many subsets of P are separable, the complexity of getSelectivity is further reduced, since smaller problems are solved independently. For instance if $Sel_\mathcal{R}(P) = Sel_{\mathcal{R}1}(P_1) \cdot Sel_{\mathcal{R}2}(P_2)$, where $|P_1|=k_1$ and $|P_2|=k_2$, the worst case running time of getSelectivity is $\mathcal{O}(3^{k_1}+3^{k_2})$, which is much smaller than $\mathcal{O}(3^{k_1+k_2})$.

In step 450, getSelectivity obtains the statistic $\mathcal{H}$ to approximate $Sel_\mathcal{R}(P|Q)$ that minimizes errors($\mathcal{H}$, $Sel_\mathcal{R}(P|Q)$). This procedure consists of 1) obtaining the set of candidate statistics that can approximate $Sel_\mathcal{R}(p|Q)$ and 2) selecting from the candidate set the statistic $\mathcal{H}$ that minimizes error($\mathcal{H}$, $Sel_\mathcal{R}(p|Q)$).

In general, a statistic $\mathcal{H}$ consists of a set of SITs. For simplicity the notation is modified to represent SITs as follows. Given query expression $q=\sigma_{p1\wedge \ldots \wedge pk}(\mathcal{R}^\mathcal{X})$, $SIT_\mathcal{R}(a_1, \ldots, a_j | p_1, \ldots, p_k)$ will be used instead of $SIT(a_1, \ldots, a_j | q)$. That is, the set of predicates of q over $\mathcal{R}^\mathcal{X}$ is enumerated, which agrees with the notation for selectivity values. It should be noted that for the purposes of this discussion SITs will be described as histograms, but the general ideas can be applied to other statistical estimators as well. Therefore $\mathcal{H}_\mathcal{R}(a_1, \ldots, a_j | p_1, \ldots, p_k)$ is a multidimensional histogram over attributes $a_1, \ldots, a_j$ built on the result of executing $\sigma_{p1\wedge \ldots \wedge pk}(\mathcal{R}^\mathcal{X})$. As a special case, if there are no predicates $p_i$, $\mathcal{H}_\mathcal{R}(a_1, \ldots, a_j |)$ is written, which is a traditional base-table histogram. The notion of predicate independence is used to define the set of candidate statistics to consider for approximating a given $Sel_\mathcal{R}(P|Q)$.

Given sets of predicates $P_1$, $P_2$, and Q it is said that $P_1$ and $P_2$ are independent with respect to Q if the following equality holds $Sel_\mathcal{R}(P_1,P_2|Q) = Sel_\mathcal{R}(P_1|Q) \cdot Sel_\mathcal{R}(P_2|Q)$ where $R_1=tables(P_1,Q)$ and $R_2=tables(P_2,Q)$. If $P_1$ and $P_2$ are independent with respect to Q, then $Sel_\mathcal{R}(P_1|P_2,Q) = Sel_{\mathcal{R}1}(P_1|Q)$ holds as well. If there is no available statistic approximating $Sel_\mathcal{R}(p|Q)$, but there is an available statistic $\mathcal{H}$ approximating $Sel_\mathcal{R}(p|Q')$, independence between P and Q' is assumed with respect to Q-Q' and $\mathcal{H}$ is used to approximate $Sel_\mathcal{R}(p|Q)$. This idea is used to define a candidate set of statistics to approximate $Sel_\mathcal{R}(P|Q)$.

Given that $\mathcal{S}=Sel_\mathcal{R}(P|Q)$ where P is a set of filter predicates, such as $\{R.a<5\ S.b>8\}$, the candidate statistics to approximate $\mathcal{S}$ are all $\{H_\mathcal{R}(A|Q'))\}$ that simultaneously verify the following three properties. 1) attr(P) $\subseteq A$ (the SIT can estimate the predicates). 2) $Q' \subseteq Q$ (assuming independence between P and Q-Q'). In a traditional optimizer, $Q'=\emptyset$, so P and Q are always assumed independent. 3) Q' is maximal, i.e., there is no $H_\mathcal{R}(A|Q'')$ available such that $Q' \subset Q'' \subseteq Q$.

In principle, the set of candidate statistics can be defined in a more flexible way, e.g., including statistics of the form $H_\mathcal{R}(A|Q')$, where Q' subsumes Q. The candidate sets of statistics are restricted as described above to provide a good tradeoff between the efficiency to identify them and the quality of the resulting approximations. For example given $\mathcal{S}=Sel_\mathcal{R}(R.a<5|p_1,p_2)$ and the statistics $H_R(R.a|p_1)$, $H_R(R.a|p_2)$, $H_R(R.a|p_1,p_2,p_3)$, and $H_R(R.a)$, the set of candidate statistics for $\mathcal{S}$ include $\{H_R(R.a|p_1)\}$ and $\{H_R(R.a|p_2)\}$. $H_R(R.a)$ does not qualify since its query expression is not maximal; and $H_R(R.a|p_1,p_2,p_3)$, does not qualify since it contains an extra predicate $p_3$.

In many cases a predicate P is composed of both filter and join predicates, e.g., $P=\{T.a<10, R.x=S.y, S.b>5\}$. To find $Sel_\mathcal{R}(P|Q)$, in this case several observations about histograms are used. If $\mathcal{H}_1=H_R(x,X|Q)$ and $\mathcal{H}_2=H_R(y,Y|Q)$ and both are SITs, the join $\mathcal{H}_1 \bowtie_{x=y} \mathcal{H}_2$ returns not only the value $Sel_\mathcal{R}(x=y|Q)$ for the join, but also a new histogram $\mathcal{H}_j=H_R(x,X,Y|x=y,Q)$. Therefore $\mathcal{H}_j$ can be used to estimate the remaining predicates involving attributes x(=y), X, and Y. As an example, to find $Sel_R(R.a<5, R.x=S.y|Q)$ given histograms $\mathcal{H}_1=H_{R1}(R.x,R.a|Q)$ and $\mathcal{H}_2=H_{R2}(S.y|Q)$, the join $\mathcal{H}_1 \bowtie_{R.x=S.y} \mathcal{H}_2$ returns the scalar selectivity value $s_1=Sel_R(R.x=S.y|Q)$ and also $\mathcal{H}_3=H_R(R.a|R.x=S.y,Q)$. The selectivity of $Sel_R(R.x=S.y, R.a<5|Q)$ is then conceptually obtained by the following atomic decomposition: $s_1 \cdot s_2 = Sel_R(R.a<5|R.x=S.y,Q) \cdot Sel_R(R.x=S.y|Q)$, where $s_2$ is estimated using $\mathcal{H}_3$.

As the example shows, $Sel_R(P|Q)$ can be approximated by getting SITs covering all attributes in P, joining the SITs, and estimating the remaining range predicates in P. In general, the set of candidate statistics to approximate $Sel_R(P|Q)$ is conceptually obtained as follows: 1) All join predicates in P are transformed to pairs of wildcard selection predicates P'. For instance, predicate R.x=S.y is replaced by the pair (R.x=?, S.y=?), and therefore $Sel_R(R.x=S.y, T.a<10, S.b>5|Q)$ results in $Sel_R(R.x=?, S.y=?, T.a<10, S.b>5|Q)$. 2) Because the join predicates in P were replaced with filter predicates in P' above, the resulting selectivity value becomes separable. Applying the separable decomposition property yields $Sel_{R1}(P'_1|Q_1) \cdot \ldots \cdot Sel_{Rk}(P'_k|Q_k)$, where no $Sel_{Ri}(P'_i|Q_i)$ is separable. 3) Each $Sel_{Ri}(P'_i|Q_i)$ contains only filter predicates in P'$_i$, so each candidate set of statistics can be found independently. In order to approximate the original selectivity value with the candidate set of statistics obtained in this way, all $\mathcal{H}_i$ are joined by the attributes mentioned in the wildcard predicates and the actual range of predicates is estimated as in the previous example.

Once the set of candidate statistics is obtained to approximate a given $Sel_R(P|Q)$, the one that is expected to result in the most accurate estimation for $Sel_R(P|Q)$ must be selected, i.e., the statistic $\mathcal{H}$ that minimizes the value of error($\mathcal{H}$, $Sel_R(P|Q)$).

In getSelectivity, error($\mathcal{H}$,$S$) returns the estimated level of accuracy of approximating selectivity $S$ using statistic $\mathcal{H}$. There are two requirements for the implementation of error($\mathcal{H}$, $S$). First, it must be efficient, since error($\mathcal{H}$, $S$) is called in the inner loop of getSelectivity. Very accurate but inefficient error functions are not useful, since the overall optimization time would increase and therefore exploiting SITs becomes a less attractive alternative. For instance, this requirement bans a technique that looks at the actual data tuples to obtain exact error values.

The second requirement concerns the availability of information to calculate error values. At first sight, it is tempting to reformulate error as a meta-estimation technique. Then, in order to estimate the error between two data distributions (actual selectivity values $S$ vs. SIT-approximated selectivity values $\mathcal{H}$) additional statistics, or meta-statistics could be maintained over the difference of such distributions. Therefore, estimating error($\mathcal{H}$, $S$) would be equivalent to approximate range queries over these meta-statistics. However, this approach is flawed, since if such meta-statistics existed, they could be combined with the original statistic to obtain more accurate results in the first place. As an example given $\mathcal{H}=H_R(R.a|p_1)$, approximating $S=Sel_R(R.a<10|p_1,p_2)$. If a meta-statistic M is available to estimate values error($\mathcal{H}$, $Sel_R(c_1 \leq R.a \leq c_2|p_1,p_2)$), $\mathcal{H}$ and M can be combined to obtain a new statistic that directly approximates $Sel_R(R.a<10|p_1,p_2)$.

Therefore error values must be estimated using efficient and coarse mechanisms. Existing information such as system catalogs or characteristics of the input query can be used but not additional information created specifically for such purpose.

Application Ser. No. 10/191,822 is now U.S. Pat. No. 6,947,927 introduced an error function, nInd, that is simple and intuitive, and uses the fact that the independence assumption is the main source of errors during selectivity estimation. The overall error of a decomposition is defined as $S=Sel_{R1}(P_1|Q_1) \cdot \ldots \cdot Sel_{Rn}(P_n|Q_n)$ when approximated, respectively, using $\mathcal{H}_{R1}(A_1|Q'_1), \ldots, \mathcal{H}_{Rn}(A_n|Q'_n)(Q'_i \subseteq Q_i)$, as the total number of predicate independence assumptions during the approximation, normalized by the maximum number of independence assumptions in the decomposition (to get a value between 0 and 1). In symbols, this error function is as follows:

$$nInd(\{Sel_R(P_i|Q_i), H_R(A_i|Q'_i)\}) = \frac{\sum_i |P_i| \cdot |Q_i - Q'_i|}{\sum_i |P_i| \cdot |Q_i|}$$

Each term in the numerator represents the fact that Pi and $Q_i$-$Q'_i$ are independent with respect to $Q_i$, and therefore the number of predicate independent assumptions is $|Pi| \cdot |Q_i-Q'_i|$. In turn, each term in the denominator represents the maximum number of independence assumptions when $Q'_i=\emptyset$, i.e $|P_i| \cdot |Q_i|$. As a very simple example, consider $S=Sel_R(R.a<10, R.b>50)$ and decomposition $S=Sel_R(R.a<10|R.b>50)$ $Sel_R(R.b>50)$. If base table histograms H(R.a) and H(R.b) are used, the error using nInd is $$\frac{1 \cdot (1-0) + 1 \cdot (0-0)}{1 \cdot 1 + 1 \cdot 0} = 1/1 = 1,$$

i.e., one out of one independence assumptions (between R.a<10 and R.b>50). nInd is clearly a syntactic definition which can be computed very efficiently.

While nInd is a very simple metric, often many alternative SITs are given the same score, and nInd needs to break ties arbitrarily. This behavior is problematic when there are two or more available SITs to approximate a selectivity value, and while they all result in the same "syntactic" nInd score, the actual benefit of using each of them is drastically different, as illustrated in the following example.

Consider $R \bowtie_{R.s=S.s} (\sigma_{S.a<10} S) \bowtie_{S.t=T.t} T$, with both foreign-key joins, and the following factor of a decomposition: $S_1=Sel_{RST}(S.a<10|R \bowtie S, S \bowtie T)$. If the only candidate SITs to approximate $S_1$ are $H_1=H_{\{R,S\}}(S.a|R \bowtie S)$ and $H_2=H_{\{R,S\}}(S.a|S \bowtie T)$, using the error function nInd, each statistic would have a score of ½, meaning that in general each alternative will be chosen at random 50% of the time. However, in this particular case $H_1$ will always be more helpful than $H_2$. In fact, since $S \bowtie_{S.t=T.t} T$ is a foreign key join, the distribution of attribute S.a over the result of $S \bowtie_{S.t=T.t} T$ is exactly the same as the distribution of S.a over base table S. Therefore, $S \bowtie_{S.t=T.t} T$ is actually independent of S. a<10 and $H_2$ provides no benefit over the base histogram H(S.a).

An alternative error function, Diff, is defined as follows. A single value, diff$_H$, between 0 and 1 is assigned to each available SIT H=H(R.a|Q). In particular, diff$_H$=0 when the distribution of R.a on the base table R is exactly the same as that on the result of executing query expression Q. On the other hand, $\text{diff}_H=1$ when such distributions are very different (note that in general there are multiple possible distributions for which $\text{diff}_H=1$, but only one for which $\text{diff}_H=0$). Using diff values, the Diff error function generalizes nInd by providing a less syntactic notion of independence. In particular, the overall error value of a decomposition $S=\text{Sel}_{\mathcal{R}1}(P_1|Q_1)\cdot\ldots\cdot\text{Sel}_{\mathcal{R}n}(P_n|Q_n)$ when approximated using $H_1, \ldots, H_n$, respectively is given by:

$$Diff(\{Sel_R(P_i \mid Q_i), H_i\}) = \frac{\sum_i |P_i|\cdot|Q_i|\cdot|1-diff_{H_i}|}{\sum_i |P_i|\cdot|Q_i|}$$

The intuition behind the expression above is that the value $|Q_i|\cdot(1-\text{diff}_{Hi})$ in the numerator represents a "semantic" number of independence assumptions when approximating $S_i$ with $H_i$, and replaces the syntactic value $|Q_i-Q'_i|$ of nInd. In fact in the previous example, $\text{diff}_{H1}=0$, and $H_1$ effectively contributes the same as a base-table histogram H(S.a), so in that case the error function is 1 (the maximum possible value). In contrast, for $H_2=H(S.a|R\triangleright\triangleleft S)$, the more different the distributions of S.a on S and on the result of executing $R\triangleright\triangleleft S$, the more likely that $H_2$ encodes the dependencies between S.a and $\{R\triangleright\triangleleft S, S\triangleright\triangleleft T\}$, and therefore the lower the overall error value.

For $H=H_\mathcal{R}(a|Q)$ with $\mathcal{R}'$ denoted as a $\sigma_Q(\mathcal{R})$(the result of evaluating Q over $\mathcal{R}$), $\text{diff}_H$ can be defined as:

$$diff_H = 1/2 \cdot \sum_{x\in dom(a)} \left(\frac{f(R,x)}{|R|} - \frac{f(R',x)}{|R'|}\right)^2$$

where $f(\mathcal{R},x)$ is the frequency of value x in $\mathcal{R}$ ($\text{diff}_H$ is the squared deviation of frequencies between the base table distribution and the result of executing H's query expression). It can be shown that $0\leq\text{diff}_H\leq1$, and that $\text{diff}_H$ verifies the properties stated above. Values of diff are calculated just once and are stored with each histogram, so there is no overhead at runtime. $\text{diff}_{H_{R(a|Q)}}$ can be calculated when $H_{R(a|Q)}$ is created, but that might impose a certain overhead to the query processor to get the f(R,a). Instead, $\text{diff}_H$ is approximated by carefully manipulating both H and the corresponding base-table histogram (which, if it does not exist, can be efficiently obtained using sampling). The procedure is similar to calculating the join of two histograms.

In essence, Diff is a heuristic ranking function and has some natural limitations. For instance, it uses a single number (Diff) to summarize the amount of divergence between distributions, and it does not take into account possible cancellation of errors among predicates. However, the additional information used by Diff makes it more robust and accurate than nInd with almost no overhead.

Referring again to the query of FIG. 3, the value of $\text{Sel}_{\{R,S,T\}}(\sigma_a,\sigma_b,\triangleright\triangleleft_{RS},\triangleright\triangleleft_{RT})$ is to be estimated where $\sigma_a$ and $\sigma_b$ represent the filter predicates over S.a and T.b, respectively, and $\triangleright\triangleleft_{RS}$ and $\triangleright\triangleleft_{RT}$ represent the foreign key join predicates. Using nInd for errors, getSelectivity returns the decomposition; $S_1=\text{Sel}_{R,S,T}(\sigma_a|\sigma_b,\triangleright\triangleleft_{RS}, \triangleright\triangleleft_{RT})\cdot\text{Sel}_{R,S,T}(\sigma_b|\triangleright\triangleleft_{RS}, \triangleright\triangleleft_{RT})\cdot\text{Sel}_{R,S,T}(\triangleright\triangleleft_{RS} \triangleright\triangleleft_{RT})\cdot\text{Sel}_{R,T}(\triangleright\triangleleft_{RT})$ using respectively, statistics $H_{R,S}(S.a\triangleright\triangleleft_{RS}) H_{R,T}(T.b\triangleright\triangleleft_{RT})$, $\{H_R(R.s), H_S(S.s)\}$, and $\{H_R(R.t), H_T(T.t)\}$.

Therefore, both available SITs are exploited simultaneously, producing a much more accurate cardinality estimate for the original query than any alternative produced by previous techniques.

Integration with an Optimizer

The algorithm getSelectivity can be integrated with rule based optimizers. For $q=\sigma_{p1}\wedge\ldots\wedge_{pk}(\mathcal{R}^{102})$, getSelectivity $(\mathcal{R}, \{p_1, \ldots, p_k\})$ returns the most accurate selectivity estimation for both q and all its sub-queries, i.e., $\text{Sel}_\mathcal{R}(P)$ for all $P\subseteq\{p_1, \ldots, p_k\}$. A simple approach to incorporate getSelectivity into an existing rule-based optimizer is to execute getSelectivity before optimization starts, and then use the resulting memoization table to answer, selectivity requests over arbitrary sub-quenes. This approach follows a pattern similar to those used by prior art frameworks to enumerate candidate sub-plans, in which a first step generates exhaustively all possible equivalent expressions and then, in a second phase, the actual search and pruning is performed. It was later established that this separation is not useful, since only a fraction of the candidate sub-plans generated during exploration is actually considered during optimization. Instead, newer frameworks interleave an exploration by demand strategy with the search and pruning phase.

Cascades is a state-of-the-art rule based optimization framework. During the optimization of an input query, a Cascades based optimizer keeps track of many alternative sub-plans that could be used to evaluate the query. Sub-plans are grouped together into equivalence classes, and each equivalence class is stored as a separate node in a memoization table (also called memo). Thus, each node in the memo contains a list of entries representing the logically equivalent alternatives explored so far. Each entry has the form [op, $\{\text{input}_1, \ldots, \text{input}_n\}$, $\{\text{parameter}_1, \ldots, \text{parameter}_k\}$], where op is a logical operator, such as join, $\text{input}_i$ is a pointer to some other node (another class of equivalent sub-queries), and $\text{parameter}_j$ is a parameter for operator op.

Figure 5:
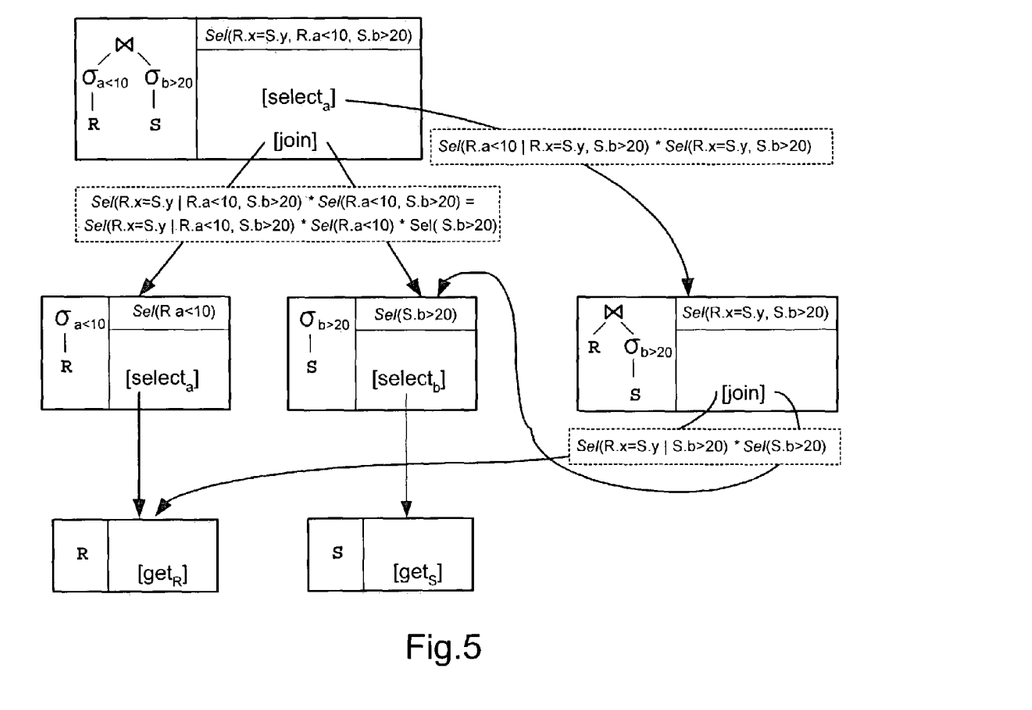
FIG. 5 is block diagram of a memo table for an optimizer that implements the method of FIG. 4.

FIG. 5 illustrates a memo that corresponds to an intermediate state while optimizing the query SELECT*FROM R, S WHERE R.x=s.Y AND R.a<10 AND S.b>5. The node at the top of the figure groups together all query plans equivalent to $(\sigma_{R.a<10}(R))\triangleright\triangleleft_{R.x=S.y}(\sigma_{S.b>5}(S))$ that were already explored. The first entry in such node is [SELECT, $\{R\triangleright\triangleleft_{R.x=S.y}(\sigma_{S.b>5}(S))\}, \{R.a<10\}]$, that is, a filter operator, with parameter R.a<10, applied to the node that groups all equivalent expressions for sub-query $R\triangleright\triangleleft_{R.x=S.y}(\sigma_{S.b>5}(S))$. Analogously, the second entry corresponds to a join operator applied to two other nodes.

During optimization, each node in the memo is populated by applying transformation rules to the set of explored alternatives. Rules consist of antecedent and consequent patterns, and optional applicability conditions. The application of a given transformation rule is a complex procedure that involves: (i) finding all bindings in the memo, (ii) evaluating rule preconditions, (iii) firing the rule, i.e., replacing the antecedent pattern with the consequent pattern, and (iv) integrating the resulting expression (if it is new) to the memo table. As a simple example, the first entry in the node at the top of FIG. 5 could have been obtained from the second entry by applying the following transformation rule: $[T_i] \triangleright\triangleleft(\sigma_p(T_2))\Rightarrow\sigma_p (T_1\triangleright\triangleleft T_2)$ which pulls out selections above join predicates ($T_1$ and $T_2$ function as placeholders for arbitrary sub-queries).

The algorithm getSelectivity can be integrated with a Cascades based optimizer. If the optimizer restricts the set of available statistics, e.g., handles only uni-dimensional SITs, then getSelectivity can be implemented more efficiently without missing the most accurate decomposition. For uni-dimensional SITs, it can be shown that no atomic decomposition $Sel_\mathcal{R}(P)=Sel_\mathcal{R}(P'|Q)\cdot Sel_\mathcal{R}(Q)$ with $|P'|>1$ will have a non-empty candidate set of statistics, and therefore be useful. In this case, line 10 in getSelectivity can be changed to:

for each $P' \subseteq P$, $Q=P-P'$ such that $|P'| \leq 1$ do  10 without missing any decomposition. Using this optimization, the complexity of getSelectivity is reduced from $\mathcal{O}(3^n)$ to $$O\sum_i \binom{n}{i} \cdot i = O(n \cdot 2^{n-1}),$$

and the most accurate selectivity estimations will be returned. As a side note, this is the same reduction in complexity as obtained when linear join trees during optimization as opposed to bushy join trees.

The search space of decompositions can be further pruned so that getSelectivity can be integrated with a cascades based optimizer by coupling its execution with the optimizer's own search strategy. This pruning technique is then guided by the optimizer's own heuristics, and therefore might prevent getSelectivity from finding the most accurate estimation for some selectivity values. However, the advantage is that the overhead imposed to an existing optimizer is very small and the overall increase in quality can be substantial.

As explained, for an input SPJ query $q=\sigma_{p1 \wedge \ldots \wedge pk}(\mathcal{R}^\chi)$, each node in the memoization table of a Cascades based optimizer groups all alternative representations of a sub-query of q. Therefore the estimated selectivity of the sub-query represented by n, i.e., $Sel_\mathcal{R}(P)$ for $P \subseteq \{p_1, \ldots, p_k\}$ can be associated with each node n in the memo. Each entry in n can be associated to a particular decomposition of the sub-query represented by n.

The node at the top of FIG. 5, which represents all equivalent representations of $(\sigma_{R'.a<10}(R)) \bowtie_{R.x=S.y} (\sigma_{S.b>5}(S))$. The second entry in such node (the join operator) can be associated with the following decomposition: $Sel_{\{R,S\}}(R.s=S.y | R.a<10, S.b>5) \cdot Sel_{\{R,S\}}(R.a<10, S.b>5)$. The first factor of this decomposition is approximated using available statistics as already explained. In turn, the second factor is separable and can be simplified as $Sel_{\{R\}}(R.a<10) \cdot Sel_{\{S\}}(S.b>5)$. The estimated selectivity of each factor of the separable decomposition is obtained by looking in the corresponding memo nodes (the inputs of the join entry being processed). Finally the estimations are multiplied together and then by the first factor of the atomic decomposition $Sel_{\{R,S\}}(R.s=S.y | R.a<10, S.b>5)$ to obtain a new estimation for $Sel_{\{R,S\}}(R.s=S.y, R.a<10, S.b>5)$.

Each entry $\mathcal{E}$ in a memo node n divides the set of predicates P that are represented by n into two groups: (i) the parameters of $\mathcal{E}$, that are denoted $p\neg$, and (ii) the predicates in the set of inputs to $\mathcal{E}$, denoted $Q\neg=P-p\neg$. The entry $\mathcal{E}$ in is then associated with the decomposition $Sel_\mathcal{R}(P)=Sel_\mathcal{R}(P\neg|Q\neg) Sel_\mathcal{R}(Q\neg)$ where each $Sel_\mathcal{R}(Q\neg)$ is separable into $Sel_{\mathcal{R}1}(Q^1) \cdot \ldots \cdot Sel_{\mathcal{R}k}(Q^k\neg)$, where each $Sel_{\mathcal{R}v}(Q^i\neg)$ is associated with the i-th input of $\mathcal{E}$.

In summary, the set of decompositions is restricted in line 10 of getSelectivity to exactly those induced by the optimization search strategy. Each time we apply a transformation rule that results in a new entry $\mathcal{E}$ in the node associated with $Sel_\mathcal{R}(P)$ to obtain the decomposition $S=Sel_\mathcal{R}(P\neg|Q\neg) Sel_\mathcal{R}(Q\neg)$. If $S$ has the smallest error found so far for the current node $Sel_\mathcal{R}(P)$ is updated using the new approximation. Therefore, the overhead imposed to a traditional Cascades based optimizer by incorporating getSelectivity results from getting, for each new entry $\neg$, the most accurate statistic that approximates $Sel_\mathcal{R}(P\neg|Q\neg)$.

So far in this description all input queries have been conjunctive SPJ queries. Disjunctive SPJ queries can also be handled by the discussed techniques. For that purpose, the identity $\sigma_{p1 \vee p2}(\mathcal{R}^\chi)=\mathcal{R}^\chi - \sigma\neg_{p1 \wedge \neg p2}(\mathcal{R}^{102}))$ is used, and the disjunctive query is translated using a de Morgan transformation to selectivity values as $Sel_\mathcal{R}(p_1 \vee p_2) = 1-Sel_\mathcal{R}(\neg p_1, \neg p_2)$. The algorithm then proceeds as before with the equality above used whenever applicable. For example, decomposition $Sel_{\{R,S,T\}}(R.a<5 \vee (S.b>10 \wedge T.c.=5))$ is rewritten as $1-Sel_{\{R,S,T\}}(R.a \geq 5, (S.b \leq 10 \vee T.c \neq 5))$. The second term is separable and is simplified to $Sel_{\{R\}}(R.a \geq 5) \cdot Sel_{\{S,T\}}(S.b \geq 10 \vee T.c \neq 5))$. The second factor can be transformed again to $1-Sel_{\{S,T\}}(S.b>10,T.c=5)$ which is again separable, and so on.

The techniques discusses can also be extended to handle SPJ queries with Group-By clauses. In the following query.

SELECT $b_1, \ldots, b_n$
FROM $R_1, \ldots, R_n$
WHERE $p_1$ AND $\ldots$ AND $p_j$
GROUP BY $a_1, \ldots, a_k$ each $b_i$ is either included in $\{a_1, \ldots, a_k\}$ or is an aggregate over columns of $\mathcal{R}^\chi$. The cardinality of q is equal to the number of groups in the output, i.e., the number of distinct values $(a_1, \ldots, a_k)$ in $\sigma_{p1 \wedge \ldots \wedge pk}(\mathcal{R}^\chi)$, and is obtained by multiplying $|\mathcal{R}^\chi|$ by the selectivity of the query below:

SELECT DISTINCT $a_1, \ldots, a_k$
FROM $R_1, \ldots, R_n$
WHERE $p_1, \ldots, p_j$ Thus, to approximate selectivity values of SPJ queries with Group By clauses, the selectivity values for SPJ queries must be estimated with set semantics, i.e., taking into account duplicate values. The definition of conditional selectivity can be extended to handle distinct values as described next. If P is a set of predicates and A is a set of attributes, tables$(P|_A)$ is defined as the set of tables referenced either in A or in P, and attr$(P|_A)$ is defined as the attributes either in A or referenced in P. $\mathcal{R}=\{\mathcal{R}_1, \ldots, \mathcal{R}_n\}$ is a set of tables and P and Q are sets of predicates, over $\mathcal{R}^\chi = \mathcal{R}_1 \chi \ldots \chi_{\mathcal{R}_n}$. A and B are sets of attributes over $\mathcal{R}$ such that attr$(P|_A) \subseteq B$. The definition of conditional selectivity is extended as:

$$Sel_R (P|_A|Q|_B) = |\pi_A^*(\sigma_P(\pi_B^*(\sigma_Q(\mathcal{R}^\chi))))|||\pi_B^*(\sigma_Q(\mathcal{R}^\chi))|$$

where $\pi_A^*(\mathcal{R})$ is a version of the projection operator that eliminates duplicate values.

The notation of $S=Sel_\mathcal{R}(P|_A|Q|_B)$ is simplified, if possible, as follows. If B contains all attributes in $\mathcal{R}, |_B$ is omitted from $S$. Similarly, if A=B then$|_A$ is omitted from $S$. Finally, if B contains all attributes in $\mathcal{R}$ and $Q=\phi$, the selectivity is rewritten as $S=Sel_\mathcal{R}(P|_A)$. The value $Sel_\mathcal{R}(P|_A)$ is then the number of distinct A values for tuples in $\sigma_p(\mathcal{R}^\chi)$ divided by $|\mathcal{R}^\chi|$.

Therefore, for a generic SPJ query with a group-by clause, the quantity $Sel_{\mathcal{R}}(p_1, \ldots, p_j|_{a_1, \ldots, a_k})$ is to be estimated.

The atomic decomposition definition can be extended as follows. $\mathcal{R}$ is a set of tables, P is a set of predicates over $\mathcal{R}$, and A is a set of attributes in $\mathcal{R}$. Then:

$Sel_{\mathcal{R}}(P|_A) = Sel_{\mathcal{R}}(P_1|_A|P_2|_B) \bullet Sel_{\mathcal{R}}(P_2|_B)$ where $P_1$ and $P_2$ partition P and $attr(P_1|_A) \subseteq B$.

Figure 6:
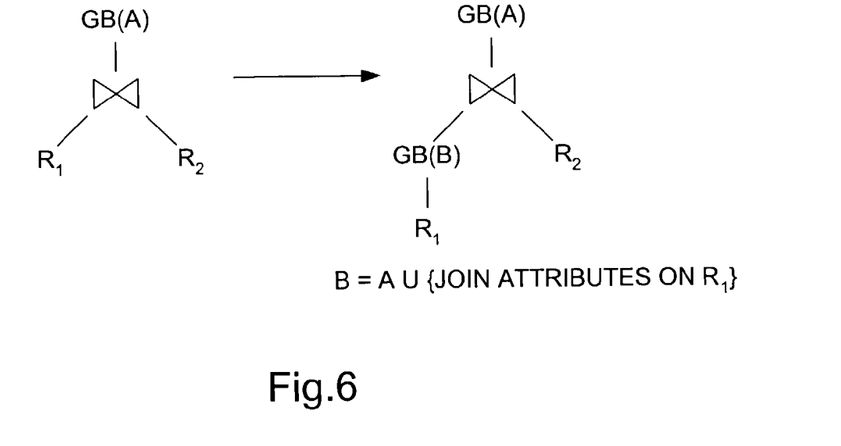
FIG. 6 is a tree diagram that illustrates a coalescing grouping transformation of query that can be used in practice of an embodiment of the present invention.

This generalized atomic decomposition can be integrated with a rule-based optimizer that implements coalescing grouping transformations for queries with group-by clauses. Coalescing grouping is an example of push-down transformations, which typically allow the optimizer to perform early aggregation. In general, such transformations increase the space of alternative execution plans that are considered during optimization. The coalescing grouping transformation shown in FIG. 6 is associated with the following instance of the atomic decomposition property $Sel_{\mathcal{R}}(\triangleright\triangleleft|_A) = Sel_{\mathcal{R}}(\phi|_A \triangleright\triangleleft \bullet_B) \cdot Sel_{\mathcal{R}}(\triangleright\triangleleft|_B)$. For the general case, the $\triangleright\triangleleft$ in the equality is replaced with the corresponding set of predicates.

Figure 7:
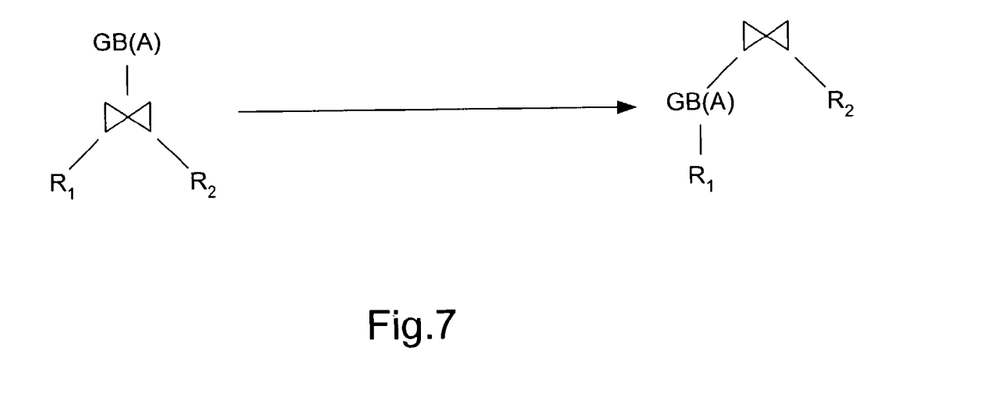
FIG. 7 is a tree diagram that illustrates an invariant grouping transformation of a query that can be used in practice of an embodiment of the present invention.

For SPJ queries the atomic and separable decompositions can be used alone to cover all transformations in a rule-based optimizer. In general, the situation is more complex for queries with group-by clauses. The separable decomposition property can be extended similarly as for the atomic property. In some cases rule-based transformations require the operators to satisfy some semantic properties such as the invariant grouping transformation shown in FIG. 7 that requires that the join predicate be defined over a foreign key of $R_1$ and the primary key of $R_2$. In this case, specific decompositions must be introduced that mimic such transformations. Using atomic decomposition it is obtained that $Sel_{\mathcal{R}}(\triangleright\triangleleft|_A) = Sel_{\mathcal{R}}(\triangleright\triangleleft|\phi|_A) \bullet Sel_{\mathcal{R}}(\phi|_A)$ However, if the invariant group transformation $Sel_{\mathcal{R}}(\triangleright\triangleleft|_A) = Sel_{\mathcal{R}}(\triangleright\triangleleft) \bullet Sel_{\mathcal{R}}(\phi|_A)$ can be applied as well. For that reason the $Sel_{\mathcal{R}}(\triangleright\triangleleft|_A) = Sel_{\mathcal{R}}(\triangleright\triangleleft) \bullet Sel_{\mathcal{R}}(\phi|_{A'})$ is used which can be easily integrated with a rule-based optimizer. This transformation is not valid for arbitrary values of P and A, but instead holds whenever the invariant grouping transformation can be applied.

In the context of SITs as histograms, traditional histogram techniques can be exploited provided that they record not only the frequency but also the number of distinct values per bucket. Referring again to FIG. 6, $Sel_{\mathcal{R}}(\triangleright\triangleleft|_A) = Sel_{\mathcal{R}}(\phi|_A \triangleright\triangleleft|_B) \bullet Sel_{\mathcal{R}}(\triangleright\triangleleft|_B)$. $H_{\mathcal{R}}(A|\triangleright\triangleleft|_B)$ can be used to approximate $Sel_{\mathcal{R}}(\phi|_A \triangleright\triangleleft|_B)$. In general, to approximate $Sel_{\mathcal{R}}(\phi|_A|Q|_B)$, some candidate SITs of the form $H_{\mathcal{R}}(A|Q'|_B)$ where $Q' \subseteq Q$ are used.

SITs can be further extended to handle queries with complex filter conditions as well as queries with having clauses. The following query asks for orders that were shipped no more than 5 days after they were placed. SELECT*FROM orders WHERE ship-date-place-date<5. A good cardinality estimation of the query cannot be obtained by just using uni-dimensional base-table histograms over columns ship-date and place-date. The reason is that single-column histograms fail to model the strong correlation that exists between the ship and place dates of any particular order. A multidimensional histogram over both ship-date=place-date might help in this case, but only marginally. In fact, most of the tuples in the two-dimensional space ship-date×place-date will be very close to the diagonal ship-date=place-date because most orders are usually shipped a few days after they are placed. Therefore, most of the tuples in orders will be clustered in very small sub-regions of the rectangular histogram buckets. The uniformity assumption inside buckets would then be largely inaccurate and result in estimations that are much smaller than the actual cardinality values.

The scope of SIT(A|Q) can be extended to obtain a better cardinality estimate for queries with complex filter expressions. Specifically, A is allowed to be a column expression over Q. A column expression over Q is a function that takes as inputs other columns accessible in the SELECT clause of Q and returns a scalar value. For instance, a SIT that can be used to accurately estimate the cardinality of the query over is H=SIT(diff-date|Q) where the generating query Q is defined as: SELECT-ship-date-place-date as diff-date FROM orders. In fact, each bucket in H with range $[x_L \ldots x_R]$ and frequency f specifies that f orders were shipped between $x_L$ and $x_R$ days after they were placed. Thus, the cardinality of the query above can be estimated accurately with a range query $(-\infty, \ldots, 5]$ over H.

This idea can also be used to specify SITs that help estimating the cardinality of queries with group-by and having clauses. The following query:

SELECT A, sum (C)
FROM R
GROUP BY A
HAVING avg(B)<10 conceptually groups all tuples in R by their A values, then estimates the average value of B in each group, and finally reports only the groups with an average value smaller than 10. The cardinality of this query can be estimated using $H_2$=SIT(avgB|$Q_2$), where the generating query $Q_2$ is defined as:

SELECT avg(B) as avgB
FROM R
GROUP BY A in this case, $H_2$ is a histogram in which each bucket with range $[x_L \ldots x_R]$ and frequency f specifies that f groups of tuples from R (grouped by A values) have an average value of B between $x_L$ and $x_R$. Therefore, the cardinality of the original query above can be estimated with a range query, with range $[-\infty \ldots 10]$, over $H_2$.

It can be seen from the foregoing description that using conditional selectivity as a framework for manipulating query plans to leverage statistical information on intermediate query results can result in more efficient query plans. Although the present invention has been described with a degree of particularity, it is the intent that the invention include all modifications and alterations from the disclosed design falling within the spirit or scope of the appended claims.

We claim:

1. A computer implemented method for approximating a number of tuples returned by a database query to optimize queries on a computerized database that comprises a set of predicates that each reference a set of database tables, the method comprising the steps of:
   a) determining whether a first estimated selectivity value of the query is stored and returning the stored first estimated selectivity value to approximate the number of tuples returned by the query;
   b) if a first estimated selectivity value of the query is not stored, expressing the query as an input selectivity value;
   c) determining if the query is separable based on properties of the input selectivity value;
   d) if the query is separable:

separating the input selectivity value to form a product of query selectivity factors;

recursively determining a selectivity value for each query selectivity factor;

combining the selectivity values for each query selectivity factor to determine a second estimated selectivity value of the query;

e) if the query is not separable:

atomically decomposing the input selectivity value to form a product that comprises a conditional selectivity expression, wherein the atomically decomposing step is repeated for one or more atomic decompositions of the input selectivity value to produce a plurality of alternative products that comprise corresponding conditional selectivity expressions;

for each of the plurality of alternative products, matching a corresponding conditional selectivity expression with stored statistics to obtain statistics that can estimate a selectivity value of the conditional selectivity expression by:

compiling a set of candidate statistics that can be used to estimate the selectivity value of the conditional selectivity expression;

selecting candidate statistics to estimate the selectivity value of the conditional selectivity expression based on a selection criteria; and using the statistics to obtain an estimated selectivity value of the conditional selectivity expression; and combining the estimated selectivity values of the conditional selectivity expressions corresponding to each alternative product to determine a third estimated selectivity value of the query;

f) storing in memory either the second or third estimated selectivity value of the query based on whether the query is separable.

2. The method of claim 1 comprising the step of multiplying the second or third estimated selectivity value of the query by a Cartesian product of the tables referenced by the predicates to obtain a cardinality of the query.

3. The method of claim 1 wherein the step of separating the input selectivity value to form a product of query selectivity factors is performed by separating the predicates that reference different sets of database tables to form a product of query selectivity factors that reference different sets of database tables.

4. The method of claim 1 wherein each product formed in step e) further comprises a query selectivity factor and wherein a selectivity value for each query selectivity factor is recursively determined.

5. The method of claim 1 wherein steps c) are recursively performed until a non-separable query selectivity that can only be decomposed into a single conditional selectivity expression results.

6. The method of claim 1 comprising the step of associating an error with the third estimated selectivity value that is based on an accuracy with which the statistic matched with a conditional selectivity expression can estimate the selectivity of the conditional selectivity expression.

7. The method of claim 6 comprising the step of combining the error associated with each conditional selectivity expression to obtain an estimated error for the third estimated selectivity value for the query.

8. The method of claim 1 wherein the stored statistics comprise histograms on results of previously executed query expressions.

9. The method of claim 1 wherein the selection criteria for a candidate statistic is determined by computing a number of independence assumptions that are made when the candidate is used to estimate the selectivity value of the conditional selectivity expression and the selection criteria is to select the candidate that results in the least number of independence assumptions.

10. The method of claim 1 wherein the selection criteria for a candidate statistic is determined by comparing the candidate statistic with a base statistic over the same column as the candidate statistic and assigning a difference value to the candidate statistic based on a level of difference between the candidate statistic and the base statistic.

11. The method of claim 1 wherein the step of compiling a set of candidate statistics is performed by including statistics that are on results of queries having the same tables referenced by the conditional selectivity expression or a subset of the tables referenced by the conditional selectivity expression and the same predicates over the tables referenced in the conditional selectivity expression or a subset of the predicates over the tables referenced in the conditional selectivity expressions.

12. The method of claim 1 wherein the step of atomically decomposing the input selectivity value is done by exhausting every alternative way of atomically decomposing the query.

13. The method of claim 1 wherein the steps of atomically decomposing the input selectivity value to form a products that comprises a conditional selectivity expressions is performed based on an optimizer search strategy.

14. The method of claim 1 wherein the query is disjunctive and comprising the step of transforming the disjunctive predicates into conjunctive predicates by performing a De Morgan transformation on the disjunctive query.

15. The method of claim 1 wherein the query comprises a GROUP BY predicate over a grouping column and wherein the query is transformed prior to performance of the method steps to return a number of distinct values in the grouping column.

16. The method of claim 15 wherein the step of atomically decomposing the input selectivity value is performed by considering decompositions that are induced by coalescing grouping.

17. The method of claim 15 wherein the step of atomically decomposing the input selectivity value is performed by considering decompositions that are induced by invariant grouping.

18. The method of claim 1 wherein the stored statistics comprise histograms built over computed columns in a query result.

19. For use with a database system, a computer readable storage medium having computer executable instructions stored thereon for performing method steps to approximate a number of tuples returned by a database query to optimize queries on the database system that comprises a set of predicates that each reference a set of database tables, the method comprising the steps of:

a) determining whether a first estimated selectivity value of the query is stored and returning the stored first estimated selectivity value to approximate the number of tuples returned by the query;

b) if a first estimated selectivity value of the query is not stored, expressing the query as an input selectivity value;

c) determining if the query is separable based on properties of the input selectivity value;

d) if the query is separable:

separating the input selectivity value to form a product of query selectivity factors;
recursively determining a selectivity value for each query selectivity factor;
combining the selectivity values for each query selectivity factor to determine a second estimated selectivity value of the query;
e) if the query is not separable:
atomically decomposing the input selectivity value to form a product that comprises a conditional selectivity expression, wherein the atomically decomposing step is repeated for one or more atomic decompositions of the input selectivity value to produce a plurality of alternative products that comprise corresponding conditional selectivity expressions;
for each of the plurality of alternative products, matching a corresponding conditional selectivity expression with stored statistics to obtain statistics that can estimate a selectivity value of the conditional selectivity expression by:
compiling a set of candidate statistics that can be used to estimate the selectivity value of the conditional selectivity expression;
selecting candidate statistics to estimate the selectivity value of the conditional selectivity expression based on a selection criteria; and
using the statistics to obtain an estimated selectivity value of the conditional selectivity expression; and
combining the estimated selectivity values of the conditional selectivity expressions corresponding to each alternative product to determine a third estimated selectivity value of the query; and
f) storing in memory either the second or third estimated selectivity value of the query based on whether the query is separable.

20. The computer readable storage medium of claim 19 comprising the step of multiplying the second or third estimated selectivity value of the query by a Cartesian product of the tables referenced by the predicates to obtain a cardinality of the query.

21. The computer readable storage medium of claim 19 wherein the step of separating input selectivity value to form a product of query selectivity factors is performed by separating the predicates that reference different sets of database tables to form a product of query selectivity factors that reference different sets of database tables.

22. The computer readable storage medium of claim 19 wherein each product formed in step e) further comprises a query selectivity factor and wherein a selectivity value for each query selectivity factor is recursively determined.

23. The computer readable storage medium of claim 19 wherein steps c) are recursively performed until a non-separable query selectivity that can only be decomposed into a single conditional selectivity expression results.

24. The computer readable storage medium of claim 19 comprising the step of associating an error with the third estimated selectivity value that is based on an accuracy with which the statistic matched with a conditional selectivity expression can estimate the selectivity of the conditional selectivity expression.

25. The computer readable storage medium of claim 24 comprising the step of combining the error associated with each conditional selectivity expression to obtain an estimated error for the third estimated selectivity value for the query.

26. The computer readable storage medium of claim 19 wherein the stored statistics comprise histograms on results of previously executed query expressions.

27. The computer readable storage medium of claim 19 wherein the selection criteria for a candidate statistic is determined by computing a number of independence assumptions that are made when the candidate is used to estimate the selectivity value of the conditional selectivity expression and the selection criteria is to select the candidate that results in the least number of independence assumptions.

28. The computer readable storage medium of claim 19 wherein the selection criteria for a candidate statistic is determined by comparing the candidate statistic with a base statistic over the same column as the candidate statistic and assigning a difference value to the candidate statistic based on a level of difference between the candidate statistic and the base statistic.

29. The computer readable storage medium of claim 19 wherein the step of compiling a set of candidate statistics is performed by including statistics that are on results of queries having the same tables referenced by the conditional selectivity expression or a subset of the tables referenced by the conditional selectivity expression and the same predicates over the tables referenced in the conditional selectivity expression or a subset of the predicates over the tables referenced in the conditional selectivity expressions.

30. The computer readable storage medium of claim 19 wherein the step of atomically decomposing the input selectivity value is done by exhausting every alternative way of atomically decomposing the query.

31. The computer readable storage medium of claim 19 wherein the steps of atomically decomposing the input selectivity value to form a product that comprises a conditional selectivity expressions is performed based on an optimizer search strategy.

32. The computer readable storage medium of claim 19 wherein the query is disjunctive and comprising the step of transforming the disjunctive predicates into conjunctive predicates by performing a De Morgan transformation on the disjunctive query.

33. The computer readable storage medium of claim 19 wherein the query comprises a GROUP BY predicate over a grouping column and wherein the query is transformed prior to performance of the method steps to return a number of distinct values in the grouping column.

34. The computer readable storage medium of claim 33 wherein the step of atomically decomposing the input selectivity value is performed by considering decompositions that are induced by coalescing grouping.

35. The computer readable storage medium of claim 33 wherein the step of atomically decomposing the input selectivity value is performed by considering decompositions that are induced by invariant grouping.

36. The computer readable storage medium of claim 19 wherein the stored statistics comprise histograms built over computed columns in a query result.

37. A computer implemented method for approximating a number of tuples returned by a database query to optimize queries on a computerized database that comprises a set of predicates that each reference a set of database tables, the method comprising the steps of:
a) expressing the query as an input selectivity value;
b) determining if the query is separable based on properties of the input selectivity value;
c) if the query is separable:

separating the input selectivity value by separating the predicates that reference different sets of database tables to form a product of query selectivity factors that reference different sets of database tables;

recursively determining a selectivity value for each query selectivity factor;

combining the selectivity values for each query selectivity factor to determine a first estimated selectivity value of the query;

d) if the query is not separable:

atomically decomposing the input selectivity value to form a product that comprises a conditional selectivity expression, wherein the atomically decomposing step is repeated for one or more atomic decompositions of the input selectivity value to produce a plurality of alternative products that comprise corresponding conditional selectivity expressions;

for each of the plurality of alternative products, matching a corresponding conditional selectivity expression with stored statistics to obtain statistics that can estimate a selectivity value of the conditional selectivity expression by:

compiling a set of candidate statistics that can be used to estimate the selectivity value of the conditional selectivity expression;

selecting candidate statistics to estimate the selectivity value of the conditional selectivity expression based on a selection criteria; and using the statistics to obtain an estimated selectivity value of the conditional selectivity expression; and combining the estimated selectivity values of the conditional selectivity expressions corresponding to each alternative product to determine a second estimated selectivity value of the query; and e) storing in memory either the first or second estimated selectivity value of the query based on whether the query is separable.

38. The method of claim 37 wherein the selection criteria for a candidate statistic is determined by computing a number of independence assumptions that are made when the candidate is used to estimate the selectivity of the conditional selectivity expression and the selection criteria is to select the candidate that results in the least number of independence assumptions.

39. The method of claim 37 wherein the selection criteria for a candidate statistic is determined by comparing the candidate statistic with a base statistic over the same column as the candidate statistic and assigning a difference value to the candidate statistic based on a level of difference between the candidate statistic and the base statistic.

40. The method of claim 37 wherein the step of compiling a set of candidate statistics is performed by including statistics that are on results of queries having the same tables referenced by the conditional selectivity expression or a subset of the tables referenced by the conditional selectivity expression and the same predicates over the tables referenced in the conditional selectivity expression or a subset of the predicates over the tables referenced in the conditional selectivity expression.

41. The method of claim 37 wherein each product formed in step d) further comprises a query selectivity factor and wherein a selectivity value for each query selectivity factor is recursively determined.

42. The method of claim 37 wherein steps b) are recursively performed until a non-separable query selectivity that can only be decomposed into a single conditional selectivity expression results.

43. The method of claim 37 comprising the step of associating an error with the second estimated selectivity value that is based on an accuracy with which the statistic matched with a conditional selectivity expression can estimate the selectivity of the conditional selectivity expression.

44. The method of claim 43 comprising the step of combining the error associated with each conditional selectivity expression to obtain an estimated error for the second estimated selectivity value for the query.

45. For use with a database system, a computer readable storage medium having computer executable instructions stored thereon for performing method steps to approximate a number of tuples returned by a database query to optimize queries on the database system that comprises a set of predicates that each reference a set of database tables, the method comprising the steps of:

a) expressing the query as an input selectivity value;

b) determining if the query is separable based on properties of the input selectivity value;

c) if the query is separable:

separating the input selectivity value by separating the predicates that reference different sets of database tables to form a product of query selectivity factors that reference different sets of database tables;

recursively determining a selectivity value for each query selectivity factor;

combining the selectivity values for each query selectivity factor to determine a first estimated selectivity value of the query;

d) if the query is not separable:

atomically decomposing the input selectivity value to form a product that comprises a conditional selectivity expression, wherein the atomically decomposing step is repeated for one or more atomic decompositions of the input selectivity value to produce a plurality of alternative products that comprise corresponding conditional selectivity expressions;

for each of the plurality of alternative products, matching a corresponding conditional selectivity expression with stored statistics to obtain statistics that can estimate a selectivity value of the conditional selectivity expression by:

compiling a set of candidate statistics that can be used to estimate the selectivity value of the conditional selectivity expression;

selecting candidate statistics to estimate the selectivity value of the conditional selectivity expression based on a selection criteria; and using the statistics to obtain an estimated selectivity value of the conditional selectivity expression; and combining the estimated selectivity values of the conditional selectivity expressions corresponding to each alternative product to determine a second estimated selectivity value of the query; and e) storing in memory either the first or second estimated selectivity value of the query based on whether the query is separable.

46. The computer readable storage medium of claim 45 wherein the selection criteria for a candidate statistic is determined by computing a number of independence assumptions that are made when the candidate is used to estimate the selectivity of the conditional selectivity expression and the selection criteria is to select the candidate that results in the least number of independence assumptions.

47. The computer readable storage medium of claim 45 wherein the selection criteria for a candidate statistic is determined by comparing the candidate statistic with a base statistic over the same column as the candidate statistic and assigning a difference value to the candidate statistic based on a level of difference between the candidate statistic and the base statistic.

48. The computer readable storage medium of claim 45 wherein the step of compiling a set of candidate statistics is performed by including statistics that are on results of queries having the same tables referenced by the conditional selectivity expression or a subset of the tables referenced by the conditional selectivity expression and the same predicates over the tables referenced in the conditional selectivity expression or a subset of the predicates over the tables referenced in the conditional selectivity expression.

49. The computer readable storage medium of claim 45 wherein each product formed in step d) further comprises a query selectivity factor and wherein a selectivity value for each query selectivity factor is recursively determined.

50. The computer readable storage medium of claim 45 wherein steps b) are recursively performed until a non-separable query selectivity that can only be decomposed into a single conditional selectivity expression results.

51. The computer readable storage medium of claim 45 comprising the step of associating an error with the second estimated selectivity value that is based on an accuracy with which the statistic matched with a conditional selectivity expression can estimate the selectivity of the conditional selectivity expression.

52. The computer readable storage medium of claim 51 comprising the step of combining the error associated with each conditional selectivity expression to obtain an estimated error for the second estimated selectivity value for the query.

53. A computer system comprising one or more processors and memory for approximating a number of tuples returned by a database query to optimize queries on a computerized database that comprises a set of predicates that each reference a set of database tables comprising:
   a) means for determining whether a first estimated selectivity value of the query is stored and means for returning the stored first estimated selectivity value to approximate the number of tuples returned by the query;
   b) means for expressing the query as an input selectivity value if a first estimated selectivity value of the query is not stored;
   c) means for determining if the query is separable based on properties of the input selectivity value;
   d) means for separating the input selectivity value to form a product of query selectivity factors if the query is separable, further comprising:
      means for recursively determining a selectivity value for each query selectivity factor;
      means for combining the selectivity values for each query selectivity factor to determine a second estimated selectivity value of the query;
   e) means for atomically decomposing the input selectivity value to form a product that comprises a conditional selectivity expression if the query is not separable, wherein the atomically decomposing is repeated for one or more atomic decompositions of the input selectivity value to produce a plurality of alternative products that comprise corresponding conditional selectivity expressions, further comprising;
      means for matching a corresponding conditional selectivity expression for each of the plurality of alternative products with stored statistics to obtain statistics that can estimate a selectivity value of the conditional selectivity expression, comprising:
         means for compiling a set of candidate statistics that can be used to estimate the selectivity value of the conditional selectivity expression;
         means for selecting candidate statistics to estimate the selectivity value of the conditional selectivity expression based on a selection criteria; and
         means for using the statistics to obtain an estimated selectivity value of the conditional selectivity expression; and
      means for combining the estimated selectivity values of the conditional selectivity expressions corresponding to each alternative product to determine a third estimated selectivity value of the query; and
   f) means for storing in memory either the second or third estimated selectivity value of the query based on whether the query is separable.

* * * * *